United States Patent

[11] 3,600,948

[72] Inventor Carl T. Luce
 23259 Collins St., Woodland Hills, Calif. 91364
[21] Appl. No. 19,358
[22] Filed Mar. 13, 1970
[45] Patented Aug. 24, 1971

[54] FLUID PRESSURE-ACTUATED TRANSDUCER AND AIRCRAFT ALTITUDE MONITORING INSTRUMENT EMBODYING SAME
 20 Claims, 7 Drawing Figs.
[52] U.S. Cl. .................................................. 73/386
[51] Int. Cl. ............................................... G01l 7/12
[50] Field of Search ....................................... 73/384, 386, 387, 410, 406, 407, 408, 179

[56] References Cited
 UNITED STATES PATENTS
 2,969,675  1/1961  Fischer .......................... 73/386

Primary Examiner—Donald O. Woodiel
Attorney—Robert Louis Finkel

ABSTRACT: A fluid pressure-actuated transducer and an aircraft altitude monitoring instrument embodying the transducer. The transducer has a fluid pressure sensor, such as a bellows, having a pressure wall which is urged in one direction by the fluid pressure force being monitored and in the opposite direction by a shaped spring force, such that the pressure wall is positioned according to a predetermined function of monitored pressure. An output shaft is drivably coupled to the pressure wall for rotation through an angle proportional to the displacement of the pressure wall resulting from a change in the monitored pressure. The shaft may drive a readout mechanism for providing a visual, mechanical, or electrical readout representing the pressure force, and a tachometer generator for generating an electrical voltage representing the rate of pressure change. The aircraft altitude monitoring instrument of the invention employs the transducer to provide a linear readout representing altitude and vertical speed, an altitude alert signal, an input signal to an autopilot or altitude transponder, or the like, and to perform other control functions.

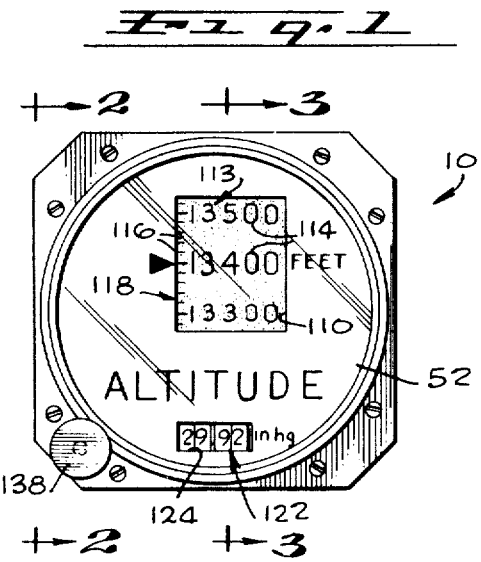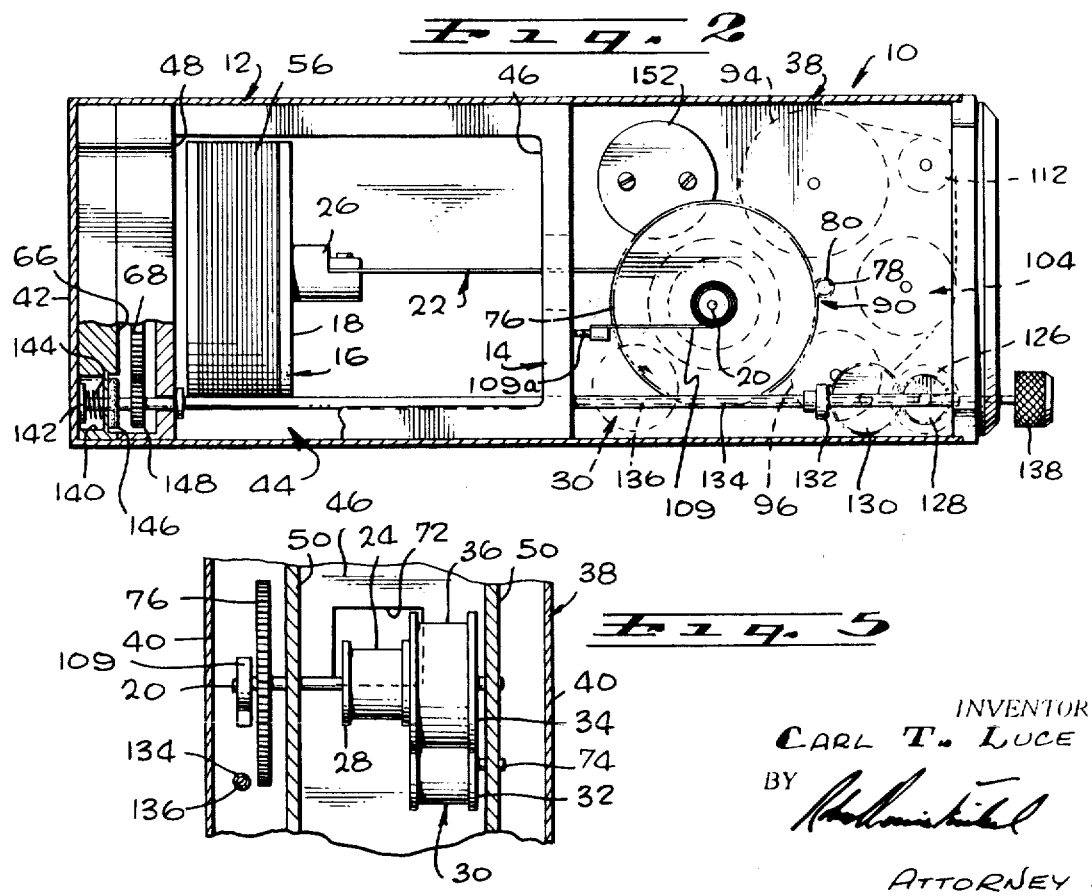

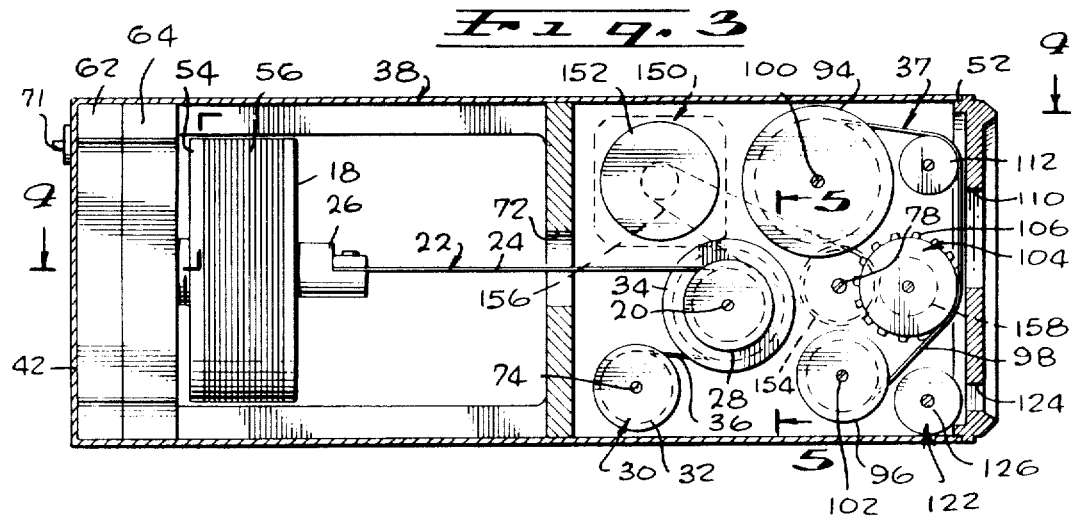
Fig. 3
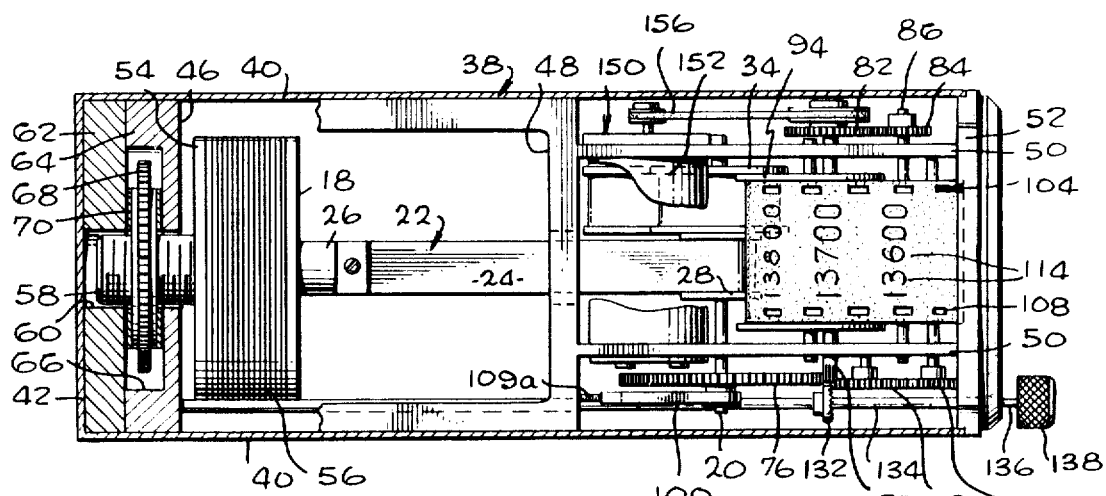
Fig. 4
CARL T. LUCE
INVENTOR
BY 
ATTORNEY

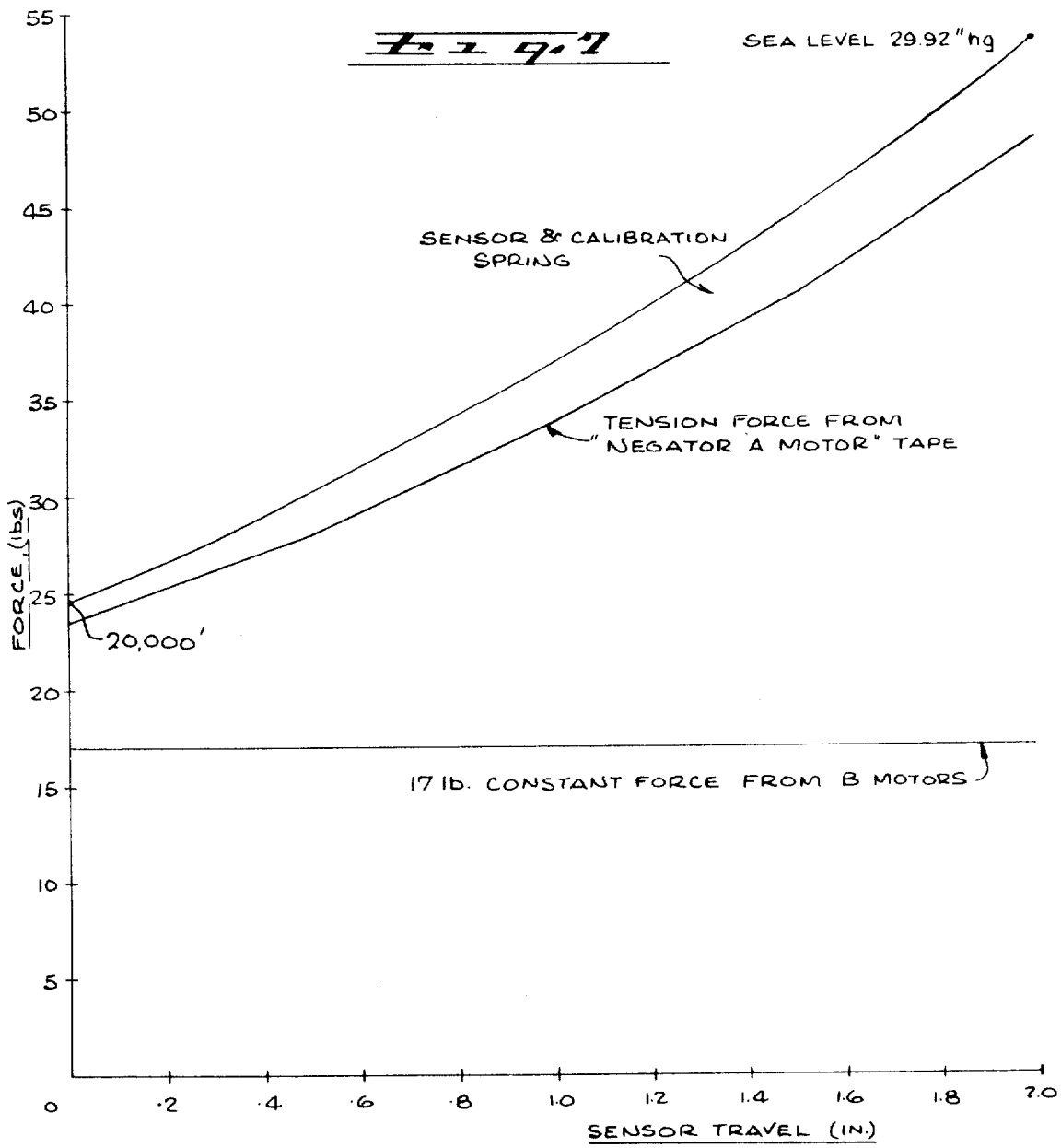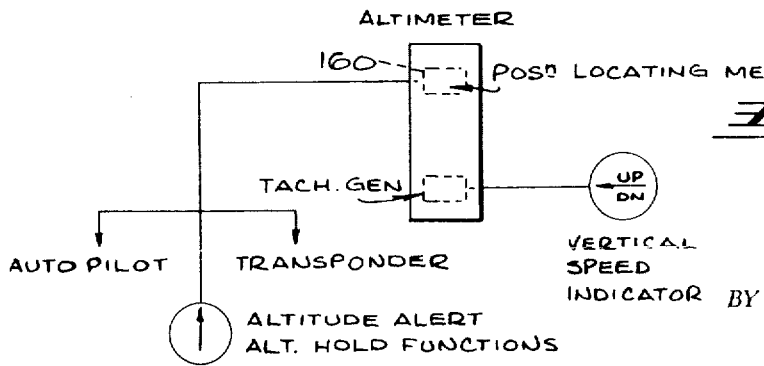

FLUID PRESSURE-ACTUATED TRANSDUCER AND AIRCRAFT ALTITUDE MONITORING INSTRUMENT EMBODYING SAME

BACKGROUND OF THE INVENTION

1. Field of the Invention

This invention relates generally to fluid pressure monitoring apparatus and more particularly to a novel fluid pressure actuator transducer for converting a varying low pressure force to a proportional mechanical motion. In its preferred use the invention relates to an aircraft altitude monitoring instrument embodying the transducer.

2. Prior Art

The present invention pertains generally to the class of mechanical fluid pressure-actuated transducers characterized by a fluid pressure sensor and a driven member connected to the sensor for movement in response to change in the fluid pressure force being monitored and through a displacement proportional to the pressure change. The mechanical motion of the driven member may be utilized directly or converted to an equivalent electrical or other output, or both. While such transducers may be employed for a wide variety of uses the present invention is concerned primarily with and will be disclosed in relation to the actuation or driving of the altitude readout mechanism of an air pressure actuated or aneroid aircraft altimeter.

A conventional aneroid altimeter has an aneroid sensor, typically a bellows, an altitude readout mechanism, and means operatively connecting the aneroid sensor and readout mechanism in a manner such that extension and compression of the sensor in response to varying air pressure occasioned by changing altitude drives the readout mechanism to display aircraft altitude. The existing instruments of this kind have certain inherent disadvantages which the present invention overcomes. One disadvantage of the existing instruments, for example, resides in their altitude readout mechanism which generally employs a rotary counter or rotary pointers to display altitude. A rotary counter altitude display has the disadvantage that digits of the counter wheels are periodically blanked out as the wheels rotate. A rotary pointer altitude display normally has two or three rotary pointers or hands, each of whose position against the dial face must be read and the several readings combined to obtain altitude. With both the rotary counter and rotary pointer displays the reading of several indicators must be interpreted to obtain altitude. As a consequence, both the rotary counter and rotary pointer altitude displays are subject to serious reading error. With the rotary pointer displays this error is compounded by the likelihood of confusion of the hands representing hundreds, thousands and tens of thousands of feet. Additionally, since the hands are mounted concentrically on these instruments, they frequently overlap and conceal or obscure one another, thereby making rapid, accurate scanning difficult if not impossible.

Another disadvantage of the existing altimeters resides in their use of a high spring rate, small deflection aneroid cell or bellows opposed by a relatively delicate return spring to sense atmospheric pressure. This aneroid sensor is characterized by a relatively low-operating force level, sensitivity and high hysteresis, resulting in relatively low instrument accuracy. Moreover, these instruments require a delicate and complex mechanism with jewel bearings to drive the altitude readout display in response to changing altitude. As a consequence, the instruments are quite fragile, sensitive to external shock loads, and require frequent checking and servicing.

Many existing altimeters are further deficient in the manner in which they match their effective load curve of force versus sensor deflection to the nonlinear load curve of atmospheric pressure versus altitude for the purpose of achieving linear altitude response and thereby permitting the use of a linear altitude readout. In these instruments linear response is generally sought to be achieved by designing the required nonlinear force/deflection function directly into the aneroid sensor itself. A sensor of this kind is difficult to make and hence costly, and at best only approximates the high degree of linearity desired in an aircraft altimeter.

In addition to actual altitude, rate of altitude change or vertical aircraft speed is important aircraft flight information which must be monitored, particularly during a landing approach under instrument conditions. Vertical speed is commonly monitored and displayed by a vertical speed indicator or variometer. The existing vertical speed indicators suffer from certain disadvantages, foremost among which are the reliance on an external control function and their delayed response to altitude change.

SUMMARY OF THE INVENTION

The present invention provides an improved fluid pressure actuated transducer and an aircraft altitude monitoring instrument embodying the transducer. For convenience in the ensuing description, this altitude monitoring instrument is referred to simply as an altimeter.

The fluid pressure-actuated transducer of the invention is characterized by a fluid pressure sensor, such as a bellows or aneroid, providing a pressure wall which is urged in one direction by the fluid pressure force being monitored and in the opposite direction by a "shaped" spring force, i.e., a spring force whose rate varies according to a predetermined function of pressure wall displacement. This shaped spring force is furnished in part by, and its shape or curve is determined primarily by, a plurality of spring means commonly known as "Negators." A rotary output shaft is drivably connected to the sensor pressure wall in a manner such that movement of the wall in either direction effects rotation of the shaft in a corresponding direction through an angle proportional to the pressure wall displacement. Since movement of the pressure wall in the direction of the pressure force is opposed by the resisting action of the shaped spring force, the transducer has an effective load curve, i.e. sensor deflection in response to pressure, determined by the shaped spring force. The effective load curve of the transducer may therefore be adjusted and predetermined by proper shaping of the spring force. In the present invention, the spring force is shaped by selective design of the force shaping "Negators" and a calibration spring adapted to cooperate with the "Negators."

The basic transducer of the invention may be employed for various uses. Its preferred use is in a direct reading aircraft altimeter which utilizes the transducer to provide a linear altitude readout and to drive a tachometer generator for generating an output voltage proportional to rate of change of altitude or vertical speed.

According to an important feature of the invention, the spring force acting on the aneroid sensor of the altimeter in opposition to atmospheric pressure is shaped to provide the altimeter with a linear response to altitude. In the disclosed altimeter, the primary shaped spring force required for linear altitude response is furnished by a variable rate spring motor commonly known as a "Negator-A-Motor." The drive band of this motor bears an altitude scale and is drivably coupled to the aneroid sensor in a manner such that deflection of the sensor in response to changing altitude drives the motor band past an altitude readout window to provide an altitude readout display. The motor produces a reaction spring force on the sensor which varies as the motor drive band moves from one motor drum to the other and is shaped by appropriate sizing of the drums relative to the natural curvature of the drive band to provide the instrument with an effective load curve closely approximating the nonlinear load curve of atmospheric pressure versus altitude. The aforementioned calibration spring is provided to permit the fine adjustment of the instrument's response curve to coincide as closely as desired with the atmospheric load curve. The position of the drive band is a linear function of altitude. This unique characteristic permits the use of a linear altitude scale on the band.

According to another feature of the invention, the altimeter is utilized to perform other altitude-related functions, such as providing an altitude input signal to an autopilot or altitude reporting transponder, providing an altitude alert signal at a selected altitude level, providing altitude deviation signals, gear warning decision heights, etc.

The altimeter of the invention is characterized by relatively high accuracy and reliability, simple and rugged construction, virtually error proof altitude readout, and immediate response to altitude changes.

BRIEF DESCRIPTION OF THE DRAWINGS

FIG. 1 illustrates the face of an altimeter according to the invention;

FIG. 2 is a section taken on line 2—2 in FIG. 1;

FIG. 3 is a section taken on line 3—3 in FIG. 1;

FIG. 4 is a section taken on 4—4 in FIG. 3;

FIG. 5 is a section taken on 5—5 in FIG. 3;

FIG. 6 diagrammatically illustrates certain control functions which may be performed by the present altimeter; and FIG. 7 is a diagram depicting the load curve of a typical altimeter according to the invention.

DESCRIPTION OF THE PREFERRED EMBODIMENTS

The drawings illustrate a fluid pressure actuated transducer 10 according to the invention embodied in a direct reading aircraft altimeter 12 of the invention. The transducer has a support 14 mounting a pressure sensor 16. In this case, the pressure sensor is a bellows. One end of this bellows provides a pressure wall 18 exposed to the fluid pressure force to be monitored and urged in one direction by the pressure force. The pressure sensor embodies an elastic spring bias force which urges the pressure wall in the opposite direction. In the particular transducer shown, the sensor bellows 16 is externally pressurized by the monitored fluid pressure. Accordingly, the pressure force tends to compress the sensor and the elastic bias force tends to expand the sensor.

Rotatably mounted on the transducer support 14 is a driven shaft 20. This shaft is coupled to the sensor pressure wall 18 by a positive drive connection 22. Movement of the pressure wall in the direction of the fluid pressure force drives the shaft in one direction of rotation, i.e. in a counterclockwise direction as viewed in FIG. 3, through an angle proportional to the pressure wall displacement. According to the preferred practice of the invention, the drive connection 22 is a constant force extension spring of the type commonly referred to as "Negator." This extension spring has a self-coiling spring drive band 24. One end of this drive band is fixed to a central stud 26 on the sensor pressure wall 18. The opposite end of the drive band is coiled about and disposed in driving engagement with a storage drum 28 fixed on the driven shaft 20. As shown in FIG. 3, the storage drum is generally tangentially disposed relative to the central axis of the pressure sensor 16, whereby the drive band 24 extends tangentially from the drum to the sensor along its central axis. In a constant force extension spring of this type, the spring drive band 24 is stressed to rewind itself on the storage drum 28 with a constant rewinding force. This constant rewinding force produces a constant axial spring force on the pressure sensor 16 in the direction of its spring bias.

Also drivably coupled to the driven shaft 20 is a constant torque spring motor 30 of the type commonly referred to as a "Negator B Motor." Motor 30 has a takeup drum 32 rotatably mounted on the transducer support 14 and an output drum 34 fixed on the driven shaft 20. Extending between the drums 32, 34 is a self-winding spring drive band 36 whose ends are coiled in the same direction about and disposed in driving engagement with the drums. The motor drums are disposed in spaced parallel relation, and the motor drive band passes between and then around the drums in the same direction to provide the band with a generally S-shaped configuration.

The motor drive band 36 encircles the output drum 34 in a direction opposite to that which the extension spring drive band 24 encircles its storage drum 28. The takeup motor drum 32 is smaller in diameter than the output drum 34, and the motor drive band 36 is stressed to rewind itself with a constant rewinding force on the takeup drum. This rewinding force produces a constant spring torque on the driven shaft 20 opposing the torque produced on the shaft by the pressure force being monitored. The constant torque motor, in turn, reacts on the pressure wall 18 through the extension spring 22 to produce a constant spring force on the wall aiding the constant force of the extension spring 22 and the spring bias force of the pressure sensor 16.

The transducer embodies an additional variable rate spring means 37 commonly known as a "Negator A-Motor." As will be explained presently, this motor is connected to the sensor pressure wall 18 and exerts on the wall a shaped spring force which varies with pressure wall displacement. The combined spring force on the pressure wall is thus a shaped spring force whose load curve, i.e. force versus pressure wall displacement, is determined primarily by the load curve of the "Negator A-Motor" 37. According to the present invention, the transducer load curve is predetermined by selective design of the A-Motor.

It is evident at this point that the sensor pressure wall 18 tends to assume a position wherein the several forces on the wall are balanced. A change in the pressure force causes displacement of the pressure wall through a distance and in a direction related to the extent and direction of the pressure change. This movement of the pressure wall drives the driven shaft 20 in a direction related to the direction of displacement of the pressure wall and through an angle proportional to the pressure wall displacement. The combined spring force produced on the pressure sensor 16 by the constant force extension spring 22 and spring motors 30, 37 counteracts the hysteresis of the pressure sensor to enhance appreciably the transducer accuracy and responsiveness.

As noted earlier, the transducer 10 of the invention may be utilized for a variety of applications. By way of example, the transducer may drive a readout mechanism for providing visual and/or electrical readouts representing the pressure force active on the pressure sensor. Also, the transducer may drive means for providing a readout representing the rate of pressure change. The aircraft altimeter 12 of the invention employs the transducer for essentially these purposes, except that the fluid pressure readouts are represented in terms of aircraft altitude, rather than in terms of pressure directly. The present aircraft altimeter may also serve other control functions as explained presently.

Referring now in detail to the altimeter 12, the latter has a hollow rectangular housing 38 with longitudinal sidewalls 40 and a rear wall 42. The front end of the housing is open. Slidably fitted within housing 38 is a frame which serves as the transducer support 14. For this reason, the supporting frame will hereafter be referred to by the reference numeral 14.

Frame 14 is removable from the altimeter housing 38 through its open front end. The frame has a hollow rear rectangular portion 44 with front and rear walls 46, 48 respectively, and a pair of spaced parallel wall members 50 integrally joined to and extending forwardly from the front frame wall 46. These wall members are vertically disposed in the normal position of the altimeter and are laterally spaced a distance from the normally vertically housing sidewalls 40. Integrally joined to the front ends of the frame wall members is a plate 52. This plate fits closely within and is sealed to the front end of the housing 38 to provide a hermetic housing enclosure. Plate 52 provides a face plate for the altimeter. Frame 14 is releasably secured within the housing 38 in any convenient manner.

The pressure sensor 16 of the altimeter 12 is an aneroid sensor or evacuated bellows having a relatively large effective area, long stroke length, and low spring rate. This aneroid sensor is positioned within the rear hollow portion 44 of the frame 14. The sensor has a front wall which constitutes the sensor pressure wall 18, a rear base wall 54, and an intervening corrugated wall 56. Corrugated wall 56 is axially extensible and compressible and is elastically stressed to assume its extended condition. Contraction of the aneroid sensor 16 thus occurs against the relatively weak elastic bias of the corrugated wall. This wall provides a portion of the elastic spring bias force referred to earlier.

Fitted to and extending rearwardly from the rear base wall 54 of the aneroid sensor 16 and is a threaded shaft 58. This shaft is slidable in aligned bores 60 in the rear frame wall 48 and a pair of spacer plates 62, 64 interposed between the rear frame wall and the rear housing wall 42. Shaft 58 is keyed against rotation in the bores 60 by suitable means (not shown). The front spacer plate 62 is recessed to form a cavity 66 containing a pinion 68. Pinion 68 is threaded on the shaft 58. Suitable thrust bearings 70 are interposed between the pinion and the cavity walls.

From this description, it will be understood that rotation of the pinion 68 drives the shaft 58 axially and thereby moves the aneroid sensor 16 bodily in its axial direction. As will appear presently, this bodily movement of the aneroid sensor in response to rotation of the pinion 68 is utilized to compensate for changes in barometric pressure and to set the altimeter to the correct altitude reading.

Mounted on the rear wall 42 of the hermetic altimeter housing 38 is a static air fitting 71. This air fitting opens to the interior of the housing and is adapted for connection to a mating static air fitting on the aircraft communicating to static atmospheric pressure. Accordingly, atmospheric pressure acts on the exterior of the aneroid sensor 16 to compress the latter in response to diminishing altitude.

The driven shaft 20 of the transducer 10 extends between and is journaled in the altimeter frame wall member 50, just below the axis of the aneroid sensor 16. As noted in the earlier description of the transducer, this shaft mounts the storage drum 28 of a constant force extension spring 24 and the output drum 34 of the constant torque spring motor 30. Extension spring storage drum 28 is vertically aligned with and is substantially tangent at its upper side to the axis of the aneroid sensor 16. The extension spring drive band 24 extends tangentially from the storage drum, rearwardly through a central opening 72 in the front plane wall 46, and is anchored at its end to a stud 26 on the front pressure wall 48 of the sensor.

Takeup drum 32 of the constant torque spring motor 30 is located between the frame wall members 50 below, to the rear, and in the plane of the motor output drum 34. The takeup drum is rotatably mounted on a shaft 74 extending between and fixed to the wall members 50. As noted earlier, the ends of the motor drive band 36 are coiled in the same direction about and are disposed in driving engagement with the motor drums 32, 34.

One end of the driven shaft 20 projects beyond the adjacent frame wall member 50 and mounts a large drive pinion 76 which turns with the shaft. Extending between and journaled in the wall members 50 forwardly of and parallel to the driven shaft 20 is an idler shaft 78 mounting a small idler pinion 80 and a large idler pinion 82. The smaller idler pinion 80 meshes with the large drive pinion 76. The large idler pinion 82 meshes with a somewhat smaller driven pinion 84 rigid on an output shaft 86. Output shaft 86 extends between and is journaled in the frame wall members 50, forwardly of and parallel to the idler shaft 78.

From the description up to this point, it will be understood that axial extension and compression of the aneroid sensor 16 effect rotation of the driven shaft 20 through an angle proportional to and in a direction related to the direction of sensor displacement. Rotation of the driven shaft, in turn, drives the output shaft 86 through the gear train 90 which comprises the pinions 76, 80, 82, and 84. The ratio of the gear train is obviously such that one revolution of the driven shaft rotates the output shaft through several revolutions. In a typical altimeter according to the invention, this gear train ratio is on the order of 1 to 10.

Rotation of the output shaft 86 is utilized to drive an altitude readout mechanism. While a variety of readout mechanisms may be employed in the altimeter, a feature of the invention resides in a use of the variable rate "Negator A-Motor" 37 as the altitude readout mechanism. This motor has an upper relatively large diameter output drum 94, a lower smaller diameter takeup drum 96, and a self-coiling spring drive band 98. The ends of band 98 are coiled in opposite directions about and are disposed in driving engagement with the output drum 94. The motor drive band 98 is stressed to rewind itself on the lower takeup drum 96 with a rewinding force which varies in response to movement of the band from one motor drum to the other, as explained presently. The motor drums 94, 96 are centered between the frame wall members 50 and are journaled on shafts 100, 102 extending between and fixed to the wall members parallel to the output shaft 86.

Fixed on the output shaft 86 is a relatively large sprocket 104. Sprocket 104 has teeth 106 meshing with sprocket holes 108 along the longitudinal edges of the motor drive band 98. Thus, rotation of the sprocket with the output shaft, in the counterclockwise direction in FIG. 3, drive the motor band 98 upwardly against the varying rewinding force of the band. Clockwise rotation of the sprocket with the output shaft drives the readout band in the downward direction of the varying rewinding force.

The varying rewinding force of the motor drive band 98 is transmitted back through the gear train 90 to produce a varying reaction torque on the driven shaft 20. This varying reaction torque acts on the driven shaft in the same direction as the constant torque produced by the constant torque spring motor 30. Accordingly, the motor 37 produces a varying spring force on the sensor pressure wall 18 aiding the constant spring forces of the extension spring 22 and the spring motor 30 and the elastic spring bias force of the corrugated sensor wall.

An additional elastic spring bias force is exerted on the aneroid sensor 16 by a calibration spring 109. This calibration spring is a conventional constant rate coil spring having one end coiled about and fixed to a drum on the driven shaft 20. The opposite end of the calibration spring is attached to the frame 14 by an adjusting screw 109a. Screw 109a is adjustable to regulate the torque exerted by the calibration spring on the driven shaft. It will be observed that the calibration spring produces a torque on the driven shaft in the same direction as the spring motors 90, 92. Accordingly, the calibration spring aids the spring forces produced on the sensor pressure wall 18 by these motors, the constant force extension spring 22, and the elastic bias force of the sensor.

The position of the pressure wall 18 of the aneroid sensor 16 is thus determined by the several continuously acting forces on the wall. These forces are the constant spring forces, the varying spring force, the elastic bias forces which act to extend the sensor, and the force exerted by the atmosphere which acts to compress the sensor. At any given constant altitude, the sensor pressure wall 18 assumes a position wherein the several forces are in balance. Any change in the atmospheric pressure occasioned either by a change in altitude or a change in barometric pressure results in the proportional displacement of the pressure wall and resulting proportional linear movement of the altitude readout band 98. The band moves downwardly from the output drum 94 to the takeup drum 96 in response to increasing altitude and upwardly from the takeup drum to the output drum in response to decreasing altitude.

The altimeter face plate 52 has a rectangular altitude readout opening 110. This readout opening is located directly opposite the drive band 98 of the spring motor 37 and just above the band drive sprocket 104. Above this opening is an idler drum 112 over which the drive band 98 passes to the upper output motor drum 94. The idler drum is journaled on a shaft extending between and fixed to the frame wall members 50. The sprocket 104 and idler drum 112 are arranged to retain the motor drive band 98 in close proximity to and parallel relationship with the rear side of the readout opening 110.

Imprinted or otherwise formed on the font side of the motor drive band 98 is an altitude scale 113. This scale includes digit sets 114 representing successive altitudes. In this case, the digit sets represent successive altitudes in 100-foot increments. Scale divisions 116 between the altitude digit sets define altitude increments of 20 feet. As shown in FIG. 1, the altitude digits sets 114 and scale divisions 116 are exposed through the readout opening 110 to provide a visual altitude readout display 118. The altitude scale 113 is read against a reference dart 120 on the altimeter face plate 52. An important feature of the invention resides in the fact that the readout opening 110 is sized to bracket three successive altitude digit sets, such that at least two digit sets are exposed at all times. Blanking of the digits as occurs in some existing altimeters is thus avoided in the present altimeter. Additionally, since altitude is shown directly, no interpretation of the altitude reading is required. Accordingly, the altitude display 118 is virtually immune to reading error.

The present altimeter is designed to operate over a given altitude range. This altitude range is typically from sea level to 20,000 or 40,000 feet. The drive train between the aneroid sensor 16 and the altitude readout band 98 has an effective ratio such that the total deflection of the aneroid sensor over the entire altitude range drives the readout band past the readout opening 110 from one end of its altitude scale 113 to the other. In order for the altimeter to display the correct altitude reading over its entire operating range, the instrument must be calibrated and adjusted to display the correct altitude reading at its current altitude, and the spacing between successive divisions of the altitude scale 113 must exactly match the travel of the altitude readout band occasioned by corresponding altitude changes. In other words the altitude scale must match the response of the instrument to changing altitude.

In this latter regard, it is well known that the load curve of atmosphere pressure, i.e. the variation of atmosphere pressure with altitude, is a nonlinear function. More specifically, the rate of change of atmospheric pressure with increasing altitude diminishes as the altitude increases. If the effective load curve of the altimeter does not closely match this nonlinear load curve of atmospheric pressure, the altimeter will have a nonlinear response to altitude and will thus require a nonlinear altitude scale which is undesirable.

A feature of the present invention resides in the fact that a linear response is achieved in a unique and simple manner through the use of the aneroid sensor 16 in combination with the constant force extension spring 22, the spring motors 30, 92, and the calibration spring 109. It has been found that the combined load curve of this unique combination of springs may be shaped to closely approximate the nonlinear load curve of atmospheric pressure and thereby provide the present altimeter with a very nearly linear response to altitude.

With regard to shaping the effective load curve of the altimeter to match the nonlinear load curve of atmospheric pressure, it is known that the drive band of a "Negator A-Motor," such as motor 37, tends to rewind itself on the smaller takeup motor drum 96 with a rewinding force P expressed by the equation:

$$P = K\left[\left(\frac{1}{R_n} - \frac{1}{R_o}\right)^2 - \left(\frac{1}{R_n} - \frac{1}{R_t}\right)^2\right]$$

where:
$K$ = a constant
$R_n$ = minimum natural radius of curvature of drive band
$R_o$ = radius of outer drive band coil on output drum
$R_t$ = radius of outer drive band coil on takeup drum It is evident from the above equation that the downward rewinding force on the altitude readout band 98 of motor 37 and hence the reaction force exerted by the band on the aneroid sensor 16 diminish nonlinearly as the band unwinds from the motor output drum 94 and winds onto the motor takeup drum 96 in response to extension of the sensor during increasing altitude. Similarly, the rewinding force on the band and its reaction force on the sensor increase nonlinearity as the band unwinds from the takeup drum and winds on the output drum in response to contraction of the sensor during decreasing altitude. Thus, the present altimeter has an effective nonlinear load curve, such that the total spring force acting on the aneroid sensor in opposition to atmospheric pressure is s shaped force which diminishes according to a nonlinear function of sensor extension as the altitude increases and increases according to a nonlinear function of sensor contraction as the altitude decreases.

It has been found that if the drum radii, the natural radius of curvature of the drive band, and the total drive band travel of the motor 37 are properly selected, the effective load curve of the altimeter may be shaped to closely match the nonlinear load curve of atmospheric pressure and thereby provide the instrument with a linear altitude response. Any slight deviations in the effective instrument load curve from the ideal load curve may be compensated by selection of the proper drum radii for the "Negator B-Motor" 30 and proper selection and adjustment of the calibration spring 109.

FIG. 7 compares the load curves of atmospheric pressure and an actual altimeter according to the invention. The "Negator A-Motor" 37 of this altimeter has the following critical dimensions:

output drum diameter     1.15 inches
takeup drum diameter     0.6 inch
maximum coil diameter $R_o$ (sea level) 1.46 inches
minumum coil diameter $R_o$ (20,000 feet) 1.17 inches
maximum coil diameter $R_t$ (20,000 feet) 1.08 inches
minimum coil diameter $R_t$ (sea level) 0.64 inch Assuming that the present altimeter is properly calibrated adjustment of the instrument to display the correct altitude is accomplished by rotating the pinion 68 on the rear aneroid sensor shaft 58 to bodily adjust the aneroid sensor 16 in its axial direction. This adjustment is effective to adjust the altitude readout band 98 endwise past the readout opening 110 independently of atmospheric pressure. Accordingly, if the altitude is accurately known, the correct altitude reading may be set into the altimeter by thus adjusting the sensor.

Under normal conditions, however, the altimeter 12 is set to the correct altitude reading in the same manner as a conventional aneroid altimeter, that is by setting a barometric pressure register 122 on the altimeter to read the local sea level barometric pressure in such a way that the altitude readout means of the altimeter are simultaneously adjusted to display the correct altitude reading when the barometric pressure register displays the existing sea level barometric pressure. In this instance, the register is a rotary counter. Counter 122 is mounted behind a readout opening 124 in the altimeter face plate 52, directly below the altitude readout opening 110. Counter 122 has a number of counter wheels 126 which are exposed through the readout opening 124 to display a barometric pressure reading.

Fixed on the counter shaft is a pinion 128 which meshes with an idler pinion 130. Idler pinion 130, in turn, meshes with a counter drive gear 132 rigid on a tubular shaft 134. Shaft 134 extends longitudinally through the altimeter housing 38, along the lower left-hand corner of the housing as the latter is viewed from the front. The rear end of the tubular shaft 134 projects into the rear spacer cavity 66. The shaft is rotatable but is restrained against axial movement.

Rotatable and moveable axially within the tubular shaft 134 is an inner shaft 136. The front end of this inner shaft projects beyond the altimeter face plate 52 and mounts a knob 138. The rear end of the inner shaft extends through the spacer plate cavity 66 into a counter bore 140 in the rear spacer plate 64. Fixed on the rear end of the inner shaft is a washer 142, between which and the front wall of the counter bore 140 is a compression spring 144. Spring 144 urges the inner shaft 136 rearwardly to disengage a friction drive collar 146 fixed on the shaft from an idler pinion 148 rigid on the rear end of the tubular shaft 134 within the spacer plate cavity 66. Idler pinion 148 meshes with the rear adustment pinion 68 for the aneroid sensor 16.

The aneroid sensor pinion 68 and counter 122 are thus positively connected by the tubular shaft 134. Accordingly, rotation of the shaft rotates the pinion and counter shaft in unison. The tubular shaft is rotated by pulling outwardly on the knob 138 of the inner shaft 136 to engage its friction drive collar 146 with the tubular shaft pinion 148 and then rotating the knob.

From the earlier description, it will be recalled that rotation of the pinion 68 adjusts the aneroid sensor 16 bodily in its axial direction to adjust the altitude readout band 98 past the altitude readout opening 110 independently of atmospheric pressure. Rotation of the tubular shaft 134 by the knob 138 is thus effective to adjust, in unison and independently of atmospheric pressure, the altitude reading of the altitude display 18 and the barometric pressure reading on the counter 122. According to the present invention, the altitude readout means, the barometric pressure counter, and the intervening drive connection are so constructed and arranged that the altimeter displays the correct altitude when the counter is set to the local sea level barometric pressure.

An important feature of the invention resides in the fact that the long stroke of the aneroid sensor 16, the relatively high effective ratio of the drive connection between the sensor and altitude readout band 98, and the relatively long length of the readout band cooperate to provide an altimeter in which the travel of the readout band between its minimum and maximum altitude positions is relatively long. This long travel of the readout band permits utilization of the earlier described varying force of the "Negator A-Motor" 37 to achieve linear altitude response as well as a long altitude scale 113 to greatly enhance the altitude readout accuracy of the instrument. The instrument accuracy is further improved by the earlier mentioned counteracting effect of the spring forces on the hysteresis of the aneroids sensor 16 and by the large operating force level of the instrument, resulting from the large effective area of the aneroid sensor.

In use, the altimeter 12 is installed in an aircraft by connecting a static air fitting 71 to a static air connection in the aircraft. The interior of the altimeter housing 38 is thereby exposed to the static atmospheric pressure. The instrument is conditioned for operation by obtaining from the local ground or flight controller the local sea level barometric pressure and setting this pressure into the barometric pressure counter or register 122. This setting of the counter automatically adjusts the aneroid sensor 16 to a position wherein the instrument displays the correct altitude reading.

The particular altimeter shown has means 150 for generating an electrical signal proportional to the rate of change of altitude, or vertical speed. Means 150 comprise a tachometer generator 152 whose output shaft is connected to a pinion 154 on the altimeter frame 14 by a belt drive 156. Pinion 154 meshes with a pinion 158 on the shaft of the altitude readout band drive sprocket 98. Accordingly, the tachometer generator 152 is driven at a speed proportional to the rate of travel of the altitude readout band 98 and thus generates an electrical output voltage proportional to the vertical speed of the aircraft. The output of the tachometer generator may thus be connected to a suitable vertical speed indicator, such as a voltmeter calibrated in terms of vertical aircraft speed. An important advantage of the present vertical speed indicator, over the existing vertical speed indicators resides in the fact that the lag in response of the existing indicators to altitude change is eliminated in the present improved instrument.

The present altimeter may be used to effect various altitude related control functions in addition to or in lieu of displaying altitude and vertical speed. Referring to FIG. 6, for example, the instrument may be equipped with a pickup 160 responsive to altitude information optically, magnetically, or mechanically recorded on the altitude readout band 98. As shown diagrammatically in the latter figure, this pickup may furnish an electrical altitude input signal to an autopilot or altitude transponder, provide an altitude alert at any desired altitude, provide altitude deviation signals, provide a gear warning decision signal, and so forth.

What I claimed is:

1. A fluid pressure-actuated transducer comprising:
a support,
a pressure sensor on said support including a moveable pressure wall to be exposed to a variable fluid pressure to be monitored for movement of the wall in one direction by said pressure,
a rotary shaft on said support,
a rotary drive connection between said pressure wall and shaft, whereby movement of said wall in said direction drives said shaft in one direction of rotation to an angle proportional to the pressure wall displacement, and
spring means including a variable spring rate motor connected to said shaft for exerting a shaped torque on said shaft in the opposite direction of shaft rotation and thereby a shaped spring force on said pressure wall opposing said fluid pressure,
said spring force being shaped to vary according to a predetermined function of pressure wall displacement.

2. A transducer according to claim 1 wherein:
said drive connection comprises a constant force extension spring including a storage drum fixed on said shaft, a self-coiling spring drive band having one end coiled about and disposed in driving engagement with said storage drum and its opposite end fixed to said pressure wall, said drive band being stressed to rewind itself on said storage drum with a constant rewinding force, and said drive band being coiled on said drum in a direction such that movement of said pressure wall by said fluid pressure pulls said drive band from said storage drum against the action of said constant rewinding force, whereby said rewinding force opposes said fluid pressure.

3. A transducer according to claim 1 wherein:
said variable spring rate motor comprises output and takeup drums rotatable on said support, the self-coiling spring drive band having its ends coiled about and disposed in driving engagement with said drums, said band being stressed to rewind itself on said takeup drum with a rewinding force which varies in response to movement of the band from one drum to the other and according to a nonlinear function of the outer radii of the band coils on said drums, and
drive means connecting said shaft and band, whereby rotation of said shaft in response to movement of said pressure wall drives said band endwise and said rewinding force produces a reaction torque on said shaft in said opposite direction of shaft rotation.

4. A transducer according to claim 3 wherein:
said drive means comprises a rotary sprocket on said support having sprocket teeth disposed in driving engagement with sprocket holes along said band, and a gear train connecting said sprocket and shaft.

5. A transducer according to claim 1 wherein:
said spring means further comprise a constant torque spring motor including an output drum fixed on said shaft, a takeup drum rotatable on said support, a self-coiling spring drive band having its ends coiled about and disposed in driving engagement with said output and takeup drums, said motor drive band being stressed to rewind itself on said takeup drum with a constant rewinding force, and said motor drive band encircling said output drum in a direction such that said rewinding force produces a constant torque on said output drum in said opposite direction of shaft rotation and thereby a constant force on said pressure wall opposing said fluid pressure.

6. A transducer according to claim 1 wherein:
said drive connection comprises a constant force extension spring including a storage drum fixed on said shaft, a self-coiling spring drive band having one end coiled about and disposed in driving engagement with said storage drum and its opposite end fixed to said pressure wall, said drive band being stressed to rewind itself on said storage drum with a constant rewinding force, and said drive band being coiled on said drum in a direction such that movement of said pressure wall in the direction of said pressure force pulls said drive band from said storage drum against the action of said constant rewinding force, whereby said rewinding force opposes said pressure force, said variable spring rate motor comprises output and takeup drums rotatable on said support, a self-coiling spring drive band having its ends coiled about and disposed in driving engagement with the said motor drums, said motor drive band being stressed to rewind itself on said takeup drum with a rewinding force which varies in response to movement of said motor band from one motor drum to the other and according to a nonlinear function of the outer radii of the motor band coils on said motor drums, and drive means connecting said shaft and motor band whereby rotation of said shaft in response to movement of said pressure wall drives said motor band endwise and said motor band rewinding force produces a torque on said shaft in said opposite direction of shaft rotation, and said spring means further comprise a constant torque spring motor including an output drum fixed on said shaft, a takeup drum rotatable on said support, a self-coiling spring drive band having its ends coiled about and disposed in driving engagement with said latter motor drums, said constant torque motor drive band being stressed to rewind itself on its takeup drum with a constant rewinding force, and said constant torque motor drive band encircling its output drum in a direction such that said latter rewinding force produces a constant torque on said latter output drum in said opposite direction of shaft rotation and thereby a constant force on said pressure wall opposing said fluid pressure.

7. A transducer according to claim 6 wherein:

said pressure sensor comprises a bellows having said pressure wall at one end, and means connected to the other end of said bellows for bodily adjusting said bellows to adjust said pressure wall in the direction of pressure wall displacement independently of said fluid pressure.

8. A transducer according to claim 1 wherein:

said pressure sensor comprises a bellows having said pressure wall at one end, and means connected to the other end of said bellows for bodily adjusting said bellows to adjust said pressure wall in the direction of pressure wall displacement independently of said fluid pressure.

9. An aircraft altimeter comprising:

a frame, an aneroid sensor on said frame including a moveable pressure wall to be exposed to static atmosphere pressure for movement of said wall in one direction by said pressure, a rotary shaft on said frame, a rotary drive connection between said pressure wall and shaft, whereby movement of said pressure wall in said direction drives said shaft in one direction of rotation through an angle proportional to the pressure wall displacement, spring means including a variable spring rate motor connected to said shaft for exerting a shaped torque on said shaft in the opposite direction of shaft rotation and thereby a shaped spring force on said pressure wall opposing atmospheric pressure, and altitude readout means connected to said shaft and operable in response to shaft rotation to produce a readout representing altitude, said shape spring force being shaped to provide said altimeter with an effective load curve of spring force versus pressure wall displacement which closely approximates the effective load curve of atmospheric pressure versus altitude, whereby said altimeter has a linear altitude response.

10. An altimeter according to claim 9 wherein:

said drive connection comprises a constant force extension spring including a storage drum fixed on said shaft, a self-coiling spring drive band having one end coiled about and disposed in driving engagement with said storage drum and its opposite end fixed to said pressure wall, said drive band being stressed to rewind itself on said storage drum with a constant rewinding force, and said drive band being coiled on said drum in a direction such that movement of said pressure wall in the direction of atmospheric pressure pulls said drive band from said storage drum against the action of said constant rewinding force, whereby said rewinding force opposes the atmospheric pressure active on said pressure wall.

11. An altimeter according to claim 9 wherein:

said variable spring rate motor comprises output and takeup drums rotatable on said frame, a self-coiling spring drive band having its ends coiled about and disposed in driving engagement with said drums, said band being stressed to rewind itself on said takeup drum with a rewinding force which varies in response to movement of the band from one drum to the other and according to a nonlinear function of the outer radii of the band coils on said drums, and drive means connecting said shaft and band, whereby rotation of said shaft in response to movement of said pressure wall drives said band endwise and said rewinding force produces a variable torque on said shaft in said opposite direction of shaft rotation.

12. An altimeter according to claim 11 wherein:

said readout means comprises an altitude scale on said motor drive band and a housing having an altitude readout window through which said altitude scale is exposed and past which said scale moves to indicate instantaneous aircraft altitude upon movement of said drive band from one drum to the other.

13. An altimeter according to claim 12 including:

electrical means drivably connected to said motor drive band for generating an electrical signal representing the rate of linear movement of said drive band and thereby vertical speed.

14. An altimeter according to claim 11 including:

electrical means driveably connected to said motor drive band for generating an electrical signal representing instantaneous aircraft altitude.

15. An altimeter according to claim 11 including:

means for bodily adjusting said bellows to adjust said pressure wall in the direction of pressure wall displacement and thereby the shaped spring force on said pressure wall independently of atmospheric pressure.

16. An altimeter according to claim 15 including:

a barometric pressure register connected to said bellows adjusting means in a manner such that said altimeter is conditioned to display the correct altitude when said register displays the local sea level barometric pressure.

17. An aircraft altimeter comprising:

a hermetic housing, an evacuated aneroid bellows within said housing having a moveable pressure wall at one end, means mounting the other end of said bellows on said housing, means for communicating the interior of said housing to static atmospheric pressure, whereby said pressure acts in one direction on said pressure wall, a rotary shaft in said housing, a constant force extension spring connecting said shaft and pressure wall including a storage drum fixed on said shaft, and a self-coiling drive band having one end coiled about said drum and its other end extending tangentially from said drum to said pressure wall parallel to the bellows axis, whereby said extension spring exerts a constant force on said pressure wall opposing atmospheric pressure and movement of said pressure wall by atmospheric pressure drives said shaft in one direction of rotation, a constant torque spring motor including an output drum fixed on said shaft, a takeup drum rotatable within said housing, a self-coiling drive band coiled about said drums for exerting a constant torque on said shaft in the opposite direction of shaft rotation, a variable spring rate motor including rotary output and takeup drums in said housing, and a self-coiling drive band coiled about said latter motor drums and stressed to rewind itself on said latter takeup drum within a variable rewinding force which varies in response to movement of the latter band from one latter drum to the other and according to a nonlinear function of the outer radii of the band coils on the latter drums, a rotary sprocket in said housing having sprocket teeth engaging in sprocket holes along the longitudinal edges of said variable rate motor band, a gear train driveably connecting said sprocket and shaft, whereby said variable rewinding force produces a variable spring torque on said shaft in said opposite direction of shaft rotation, said extension spring and spring motors coacting to produce on said pressure wall a shaped spring force which varies according to a predetermined function of pressure wall displacement such that said variable rate motor band is positioned longitudinally according to a linear function of altitude, and a linear altitude scale on said variable rate motor band exposed through an altitude readout window in said housing.

18. An altimeter according to claim 17 including:

a barometric pressure register within said housing visible through a barometric pressure readout window in said housing, and means for axially adjusting said other end of said bellows and simultaneously adjusting the reading on said register independently of atmospheric pressure in a manner such that said altimeter displays the correct altitude when said register displays the local sea level barometric pressure.

19. An altimeter according to claim 17 including:

electrical means operatively associated with said variable rate motor band for generating an electrical signal representing altitude.

20. An altimeter according to claim 17 including:

electrical means driveably connected to said variable rate motor band for generating an electrical signal representing the rate of linear movement of said latter band and thereby vertical aircraft speed.